(12) United States Patent
Chien et al.

(10) Patent No.: US 9,732,677 B1
(45) Date of Patent: Aug. 15, 2017

(54) BROADBAND ACOUSTIC PANELS COUPLED WITH LARGE SECONDARY CAVITIES TO ATTENUATE LOW FREQUENCIES

(71) Applicant: ROHR, INC., Chula Vista, CA (US)

(72) Inventors: Eugene Chien, San Diego, CA (US); Jia Yu, San Diego, CA (US); Song Chiou, Irvine, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 15/153,442

(22) Filed: May 12, 2016

(51) Int. Cl.
| | | |
|---|---|---|
| *F02C 7/24* | (2006.01) | |
| *B64D 33/02* | (2006.01) | |
| *F02K 1/34* | (2006.01) | |
| *G10K 11/168* | (2006.01) | |
| *G10K 11/172* | (2006.01) | |

(52) U.S. Cl.
CPC ............... *F02C 7/24* (2013.01); *B64D 33/02* (2013.01); *B64D 33/06* (2013.01); *G10K 11/168* (2013.01); *G10K 11/172* (2013.01); *B64D 2033/0206* (2013.01)

(58) Field of Classification Search
CPC ............ F02C 7/24; B64D 33/02; B64D 33/06
USPC ........................................ 181/213, 214, 292
See application file for complete search history.

(56) References Cited

U.S. PATENT DOCUMENTS

| | | | | | |
|---|---|---|---|---|---|
| 3,439,774 | A | * | 4/1969 | Callaway | F02K 1/827 181/222 |
| 3,910,374 | A | * | 10/1975 | Holehouse | G10K 11/172 181/292 |
| 3,948,346 | A | * | 4/1976 | Schindler | E04B 1/86 181/286 |
| 4,084,367 | A | * | 4/1978 | Saylor | B29D 24/005 181/292 |
| 4,235,303 | A | * | 11/1980 | Dhoore et al. | B64D 33/02 181/214 |
| 4,298,090 | A | | 11/1981 | Chapman | |
| 4,465,725 | A | * | 8/1984 | Riel | B29D 24/005 181/292 |
| 5,160,248 | A | * | 11/1992 | Clarke | F01D 21/045 156/276 |
| 5,543,198 | A | * | 8/1996 | Wilson | B32B 3/12 181/292 |
| 5,618,010 | A | | 4/1997 | Pla et al. | |
| 6,179,086 | B1 | | 1/2001 | Bansemir et al. | |
| 6,619,913 | B2 | * | 9/2003 | Czachor et al. | F01D 21/045 415/119 |
| 6,688,558 | B2 | * | 2/2004 | Olsen et al. | B64D 15/04 244/134 B |
| 8,820,477 | B1 | * | 9/2014 | Herrera et al. | F02C 7/045 181/284 |
| 8,931,588 | B2 | * | 1/2015 | Murray | F02K 3/06 181/214 |
| 2009/0250293 | A1 | * | 10/2009 | Gleine et al. | B60R 13/0815 181/292 |

(Continued)

*Primary Examiner* — Jeremy Luks
(74) *Attorney, Agent, or Firm* — Snell & Wilmer, L.L.P.

(57) ABSTRACT

A structural panel for an aircraft nacelle may comprise a core between a perforated skin and a septum. A plurality of dividing walls may extend between the septum and a backskin to define a plurality of cavities. Each cavity may be in fluid communication with a plurality of cells in the core through the septum. The cells and the cavities may attenuate noise.

13 Claims, 6 Drawing Sheets

(56) References Cited

U.S. PATENT DOCUMENTS

| | | | |
|---|---|---|---|
| 2010/0284789 A1* | 11/2010 | Brooks et al. | F01D 5/26 |
| | | | 415/119 |
| 2013/0020148 A1* | 1/2013 | Nakajima et al. | E04B 1/86 |
| | | | 181/292 |
| 2013/0142624 A1* | 6/2013 | Julliard et al. | F02C 7/24 |
| | | | 415/119 |
| 2016/0076453 A1* | 3/2016 | Richter | B64D 33/02 |
| | | | 181/286 |

* cited by examiner

BROADBAND ACOUSTIC PANELS COUPLED WITH LARGE SECONDARY CAVITIES TO ATTENUATE LOW FREQUENCIES

FIELD

The present disclosure relates to acoustic sandwich panels, and more particularly, to acoustic sandwich panels for aerospace applications and especially in nacelle structures.

BACKGROUND

Acoustic sandwich panels, comprising two skins bounding a core structure (such as honeycomb core), are common building blocks used in aerospace and other fields. They typically comprise two skin surfaces which sandwich between them at least one layer of a core material. Typically the two skins and the core may be bonded together or cured/formed together, but mechanical fastening is also used in some applications. The core ties the skins together structurally, and can form a very rigid, efficient, and lightweight structure useful in aerospace applications. In many applications, the acoustic sandwich panel serves a structural role in addition to an acoustic role, but in some applications the structural function may be secondary to the acoustics. In aerospace, nacelles which house turbofan gas turbine engines on a commercial transport airplane may use acoustic sandwich panels to form the inner barrel of the inlet, the inner fixed structure of the thrust reverser, the translating sleeve of a translating sleeve type thrust reverser, and portions of an exhaust system.

In some applications, there is a tension between the acoustic attenuation requirements for an acoustic sandwich panel, and the structural and packaging requirements. For example, to attenuate an increasing pressure level of low frequency noise from modern high-bypass-ratio turbofan engines (because fans are increasingly larger and slower turning), an acoustic sandwich panel may require larger cavities that are tuned to these lower frequencies. But constructing a typical acoustic sandwich panel with increasingly larger cavities may not allow the panel to fulfill its requirements related to structural capability, and/or may not be possible within the packaging, size, and weight constraints.

The invention herein allows for a new balance between a panel's acoustic capabilities, especially at the lower end of the frequency range, and its structural capabilities and packaging requirements.

SUMMARY

An acoustic panel for an aircraft nacelle may comprise a core; a permeable skin coupled to the core; a permeable septum coupled to the core; a back skin; and a dividing wall extending between the permeable septum and the back skin, wherein the permeable septum, the dividing wall, and the back skin define a first back cavity, and wherein the first back cavity is in fluid communication with a plurality of cells in the core through the septum.

In various embodiments, the core may comprise a honeycomb core. The acoustic panel may comprise a second cavity defined by the permeable septum, the dividing wall, and the back skin. A volume of the first back cavity may be equal to a volume of the second (adjacent) cavity. A width of the first back cavity may be greater than a width of the second (adjacent) cavity. A height of the first back cavity may be greater or less than a height of the second (adjacent) cavity. A height of the first back cavity may be less than a height of the plurality of cells. A volume of the first back cavity may be greater than a volume of a first cell in the plurality of cells. A height of a first dividing wall may be greater than a height of a second dividing wall. The cavity may be rectangular or other shapes. The plurality of cells may be hexagonal.

An acoustic panel may comprise a core comprising a plurality of cells; and a plurality of cavities disposed between a septum and a back skin, wherein a first back cavity in the plurality of cavities is in fluid communication with a first cell and a second cell in the plurality of cells via the septum, and wherein the first cell is in fluid communication with the first back cavity and a second cavity in the plurality of cavities via the septum.

In various embodiments, the core may be coupled to the septum and a perforated skin. A volume of the first back cavity may be equal to a volume of the second cavity. A width of the first back cavity may be greater than a width of the second cavity.

An aircraft nacelle may comprise an acoustic panel, the acoustic panel comprising: a core; a perforated skin coupled to the core; a septum coupled to the core; a back skin; and a dividing wall extending between the septum and the back skin, wherein the septum, the dividing wall, and the back skin define a first back cavity, wherein the first back cavity is in fluid communication with a plurality of cells in the core through the septum.

In various embodiments, the core may comprise a honeycomb core. The acoustic panel may comprise a second cavity. A volume of the first back cavity may be equal to a volume of the second cavity. A width of the first back cavity may be greater than a width of the second cavity.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 2 B illustrates a perspective view of an acoustic sandwich panel with a foldable cavity in accordance with various embodiments;

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
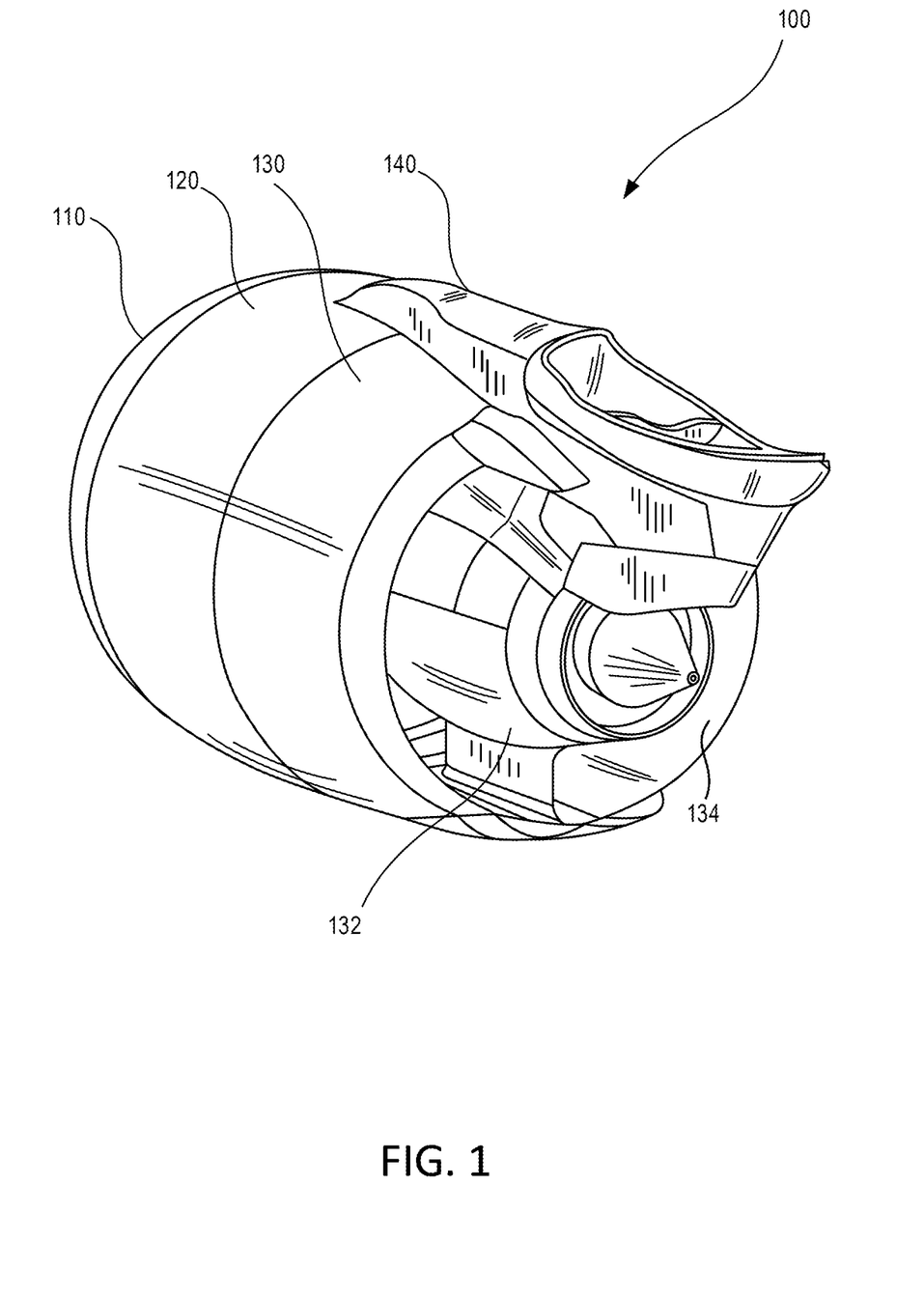
FIG. 1 illustrates a perspective view of a nacelle for an aircraft in accordance with various embodiments.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled directly or indirectly to a pylon 140, which may mount the nacelle 100 to an aircraft wing or aircraft body. Thrust reverser 130 may comprise an inner fixed structure ("IFS") 132 and a translating sleeve 134. Bypass air from an engine fan may flow in a generally annular bypass air duct defined between the IFS 132 and the translating sleeve 134. Portions of the IFS 132, the translating sleeve 134, and the inlet 110 may be commonly formed using acoustic sandwich panels.

Figure 2A:
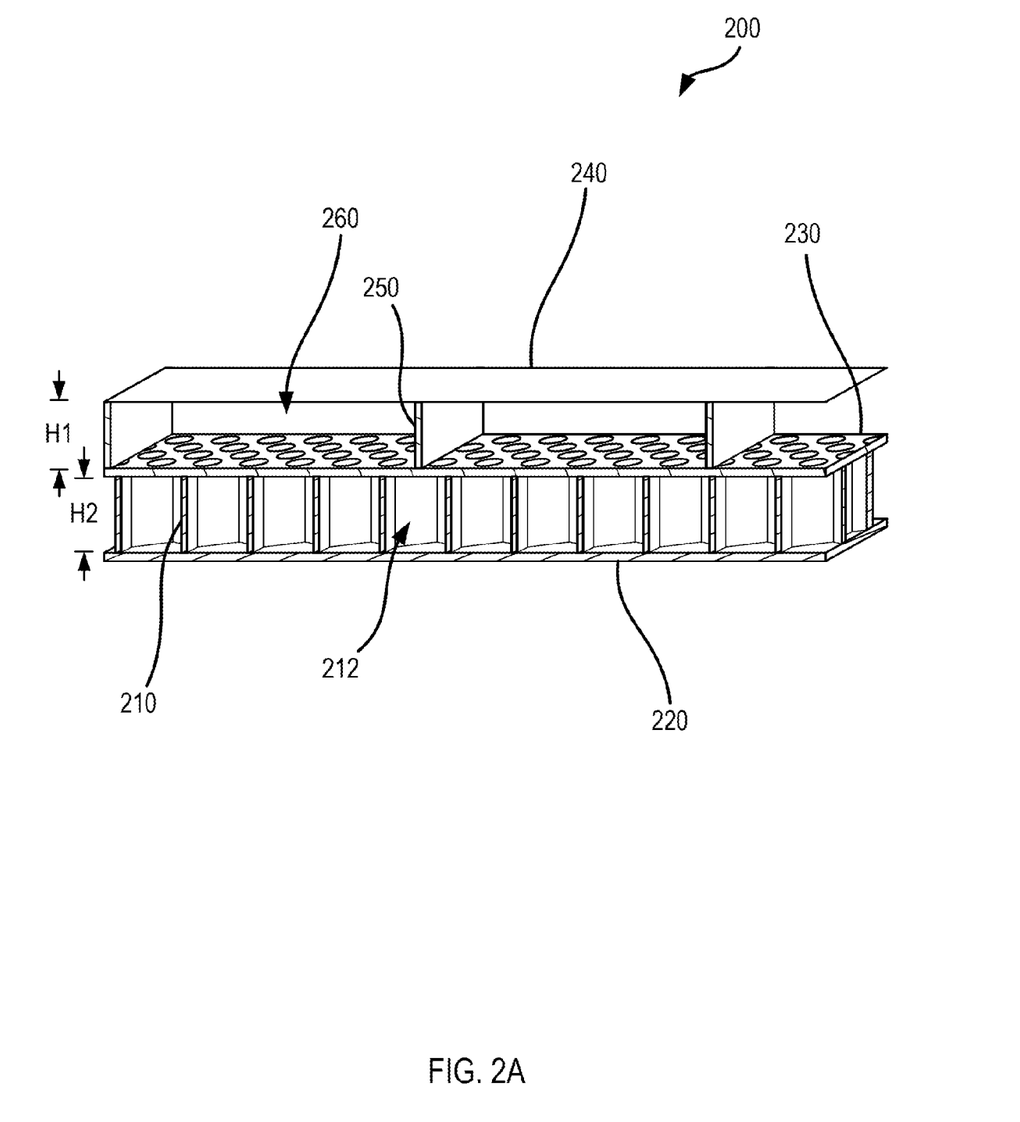
FIG. 2A illustrates a perspective view of an acoustic sandwich panel in accordance with various embodiments.

Referring to FIG. 2A, an acoustic sandwich panel 200 is illustrated according to various embodiments. The acoustic sandwich panel 200 may be used to form portions of a nacelle for an aircraft engine, as described above. The acoustic sandwich panel 200 may comprise a core 210, positioned between a first skin 220 and a septum 230. The core 210 may have walls 211 extending generally in a normal direction from the first skin 220 to the septum 230 that form a plurality of cells 212. Cells 212 may be hexagonal in cross-sectional shape in which case the core 210 is often referred to as honeycomb core. However, the cells 212 could have any of a number of different configurations, such as square, rectangular, circular, etc. Core walls 211 may be made from various metals such as titanium or aluminum, or composites, or hardened paper or other plastics, according to the particular application and required material properties. The core walls 211 may be bonded to one another with adhesive or welding or other methods to form the cellular structure.

The cells of core 210, along with the first skin 220 and the septum 230 combine to form primary acoustic resonating chambers, or simply primary acoustic chambers. The first skin 220 is perforated in a known manner to allow sound waves, such as noise from an aircraft engine, to enter the primary acoustic chambers. As those of ordinary skill in this art will appreciate, sound waves within a certain frequency range will cause the air in the primary acoustic chamber to resonate, which causes in turn a sound wave to be emitted from the chamber through the first skin 220 which is one hundred and eighty degrees (180°) out of phase compared to the sound waves entering the chamber. The out of phase wave destructively interferes with the incoming noise wave to attenuate the noise. Those of ordinary skill in this art will appreciate that the foregoing is a somewhat simplified approach to explaining how the primary acoustic chamber acts to attenuate sound, and a fuller scientific explanation is not necessary to understand and use the present invention. It will be sufficient to note that the parameters of the primary acoustic chamber, including its overall size and dimensions, and the perforation size and number of perforations in the first skin 220, are the primary factors which influence its resonant frequency and the frequency of sound which it can mitigate. For the cell size illustrated in FIG. 2A, along with perforations between 0.030 to 0.060 inches in diameter formed in first skin 220, and a percent open area (POA) of the perforations between 4-30%, a typical range of for the resonant frequency may be 2000 Hz to 5000 Hz, a mid to high frequency range.

The first skin 220 and the septum 230 may be a metallic skin, or they may be formed of laminar plies of composites such as carbon, glass, or aramid fiber reinforcement joined together with a matrix or thermoset or thermoplastic polymer. Other types of materials, including other types of fibers and matrix materials may be used to suit a particular application. As described above, the first skin 220 may comprise perforations which may be round or other shapes, uniform or non-uniform. The perforations may include a microporous skin, a metal or non-metallic meshes as well as screen/film-like permeable material enclosed within the perforation, or placed as an outer surface on first skin 220. Rather than a solid skin formed with distinct perforations, first skin 220 may also be formed of a porous material or a mesh material or other woven material that allows sound waves to travel through it. The permeability of first skin 220 to sound may be achieved in any number of known manners, as will be understood by those of ordinary skill in this art. It is also possible that one or more additional septums formed of perforated or porous material may be included inside the cells 212 to subdivide them into more than one acoustic chamber tuned to resonate at more than one frequency range, as is already known in the art.

The septum 230 may also be permeable to allow sound waves to travel through the septum 230 and into a back cavity 260 formed by a back skin 240 and a plurality of dividing walls 250. The permeability of septum 230 may be achieved with perforations or by constructing it from a porous or mesh material, in the same manner as was described in relation to the first skin 220, examples of which are given above.

The back skin 240 and the dividing walls 250 may comprise a non-perforated material and may be formed from a metal sheet or from laminar layers of composite material, in the same manner and with the same options as was described above in relation to the first skin 220 and the septum 230. A plurality of dividing walls 250 may extend between the septum 230 and the back skin 240. The septum 230, the back skin 240, and the dividing walls 250 may together form a plurality of back cavities 260. The back cavities 260 are overlapped with and connected to the cells 212 through the permeable septum 230 and combine to form secondary acoustic resonating chambers, or simply secondary acoustic chambers. The total volume of each secondary acoustic chamber, which is the sum of the volume of the back cavity 260 and the respective acoustically connected and overlapping cells 212, is significantly larger than the volume of the primary acoustic chambers. Therefore, the secondary acoustic chambers resonate at a frequency lower than the resonant frequency of the primary acoustic chambers. The volume and dimensions of the secondary acoustic chambers may be adjusted so that the chambers are configured to attenuate important tonal noises produced by a modern, large fan diameter, high bypass ration turbofan engine in the low-to-middle frequency range of about 200 to 2000 Hz. A volume of the cavities 260 may be adjusted by changing the height or locations of the dividing walls 250. Additionally, the shapes of the cavities 260, the POA of the septum 230, the thickness of the septum 230, and other variables may all be adjusted in order to tune the cavities 260 to desired acoustic properties. The "footprint" of a single cavity 260 may be larger than the footprint of a single cell 212. Thus, one cavity 260 may be in fluid communication with a plurality of cells 212 through the septum 230. Additionally, around the perimeter of a cavity 260, and as a consequence of certain manners of constructing the panel 200, a single cell 212 may overlap multiple cavities 260 on either side of dividing walls 250, such that the single cell 212 may be in fluid communication with multiple cavities 260. In some embodiments, a height H1 of the cavity 260 may be less than a height H2 of the cells 212, as illustrated in FIG. 2.

Figure 2B:
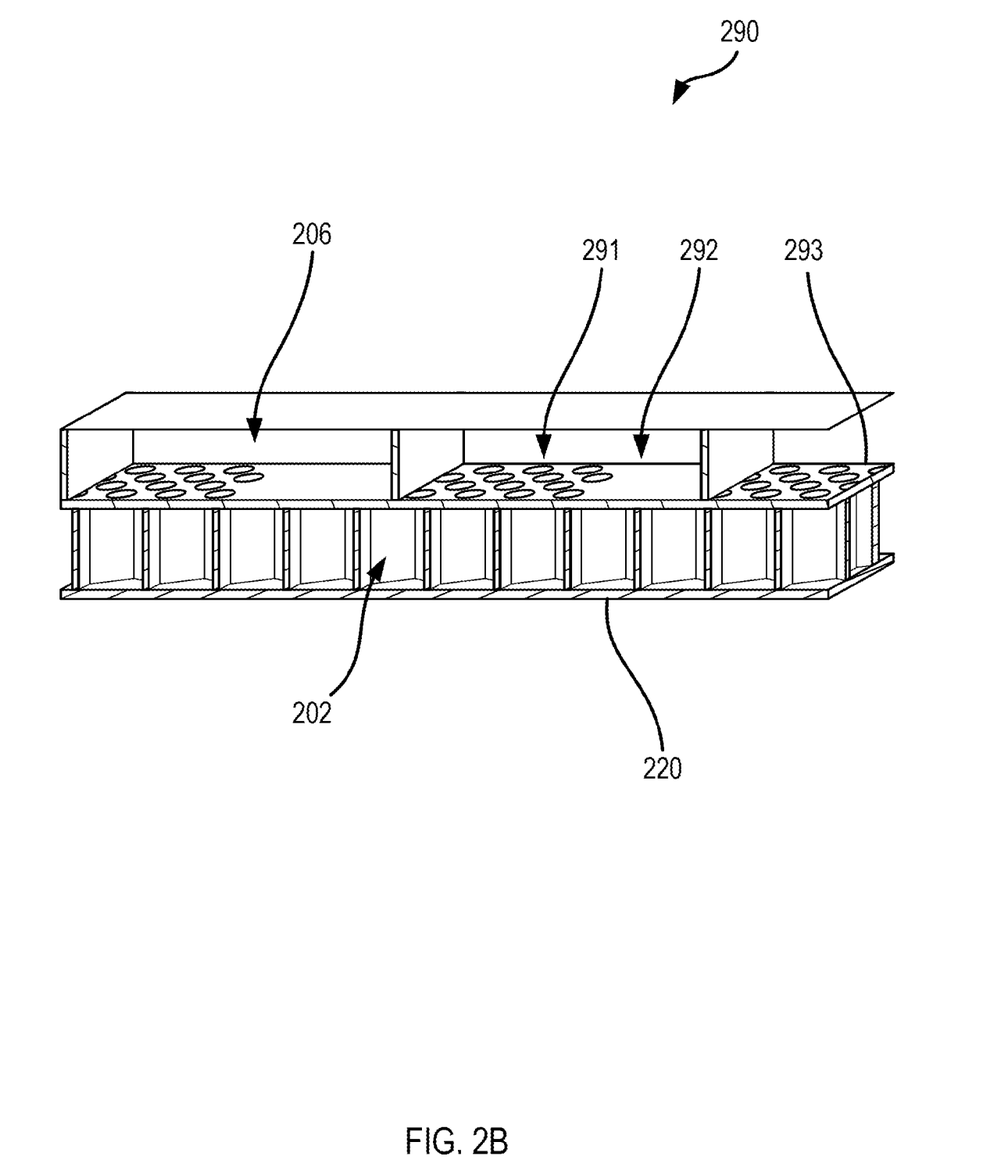

Referring to FIG. 2B, an acoustic panel 290 with a foldable cavity is illustrated according to various embodiments. The construction of septum 293 can be separated into permeable portion 291 and solid skin portion 292. This embodiment can form two configurations to tune noise attenuation in low and high frequency noise. The permeable portion 291 coupled between the first chamber 202 and the secondary chamber 206 to form a double degree of freedom (DDOF) folding cavity to attenuate low frequency noise. The solid skin portion 292 will provide a single degree of freedom (SDOF) liner to attenuate the high frequency noise.

Figure 3:
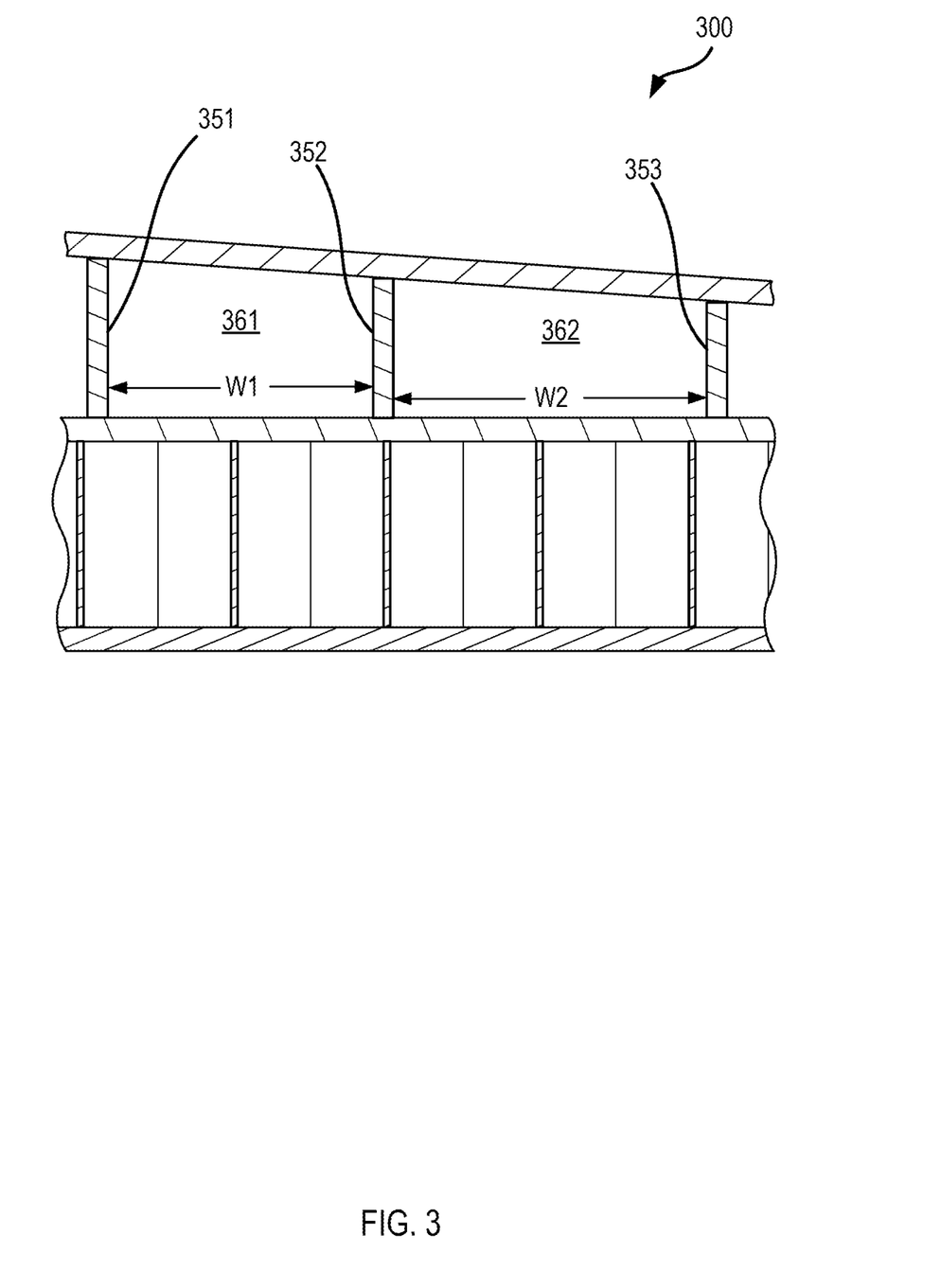
FIG. 3 illustrates a cross-section view of an acoustic sandwich panel with cavities of equal volumes in accordance with various embodiments.

Referring to FIG. 3, a cross-section view of an acoustic sandwich panel 300 with back cavities 361, 362 of equal volume is illustrated according to some embodiments. By changing the locations of the dividing walls, the properties of the back cavities may be easily tuned. It may be desired for all or most of the back cavities to have equal volume in order to attach certain tonal noises in a single frequency band. However, some portions of acoustic panel 300 may have an overall height that is less than other locations due to packaging or other constraints. Assuming that it is desirable to maintain as constant the height of the cells that substantially make-up the first acoustic chambers, then the height of the back cavities will vary as a result. With a varying average height among the back cavities, the distance W1, W2 between the dividing walls 351, 352, and 353 may be varied to maintain as relatively constant the volumes of the back cavities 361, 362. This may result in similar acoustic properties for the secondary acoustic chambers, even if the back cavities are of varying dimensions.

Figure 4:
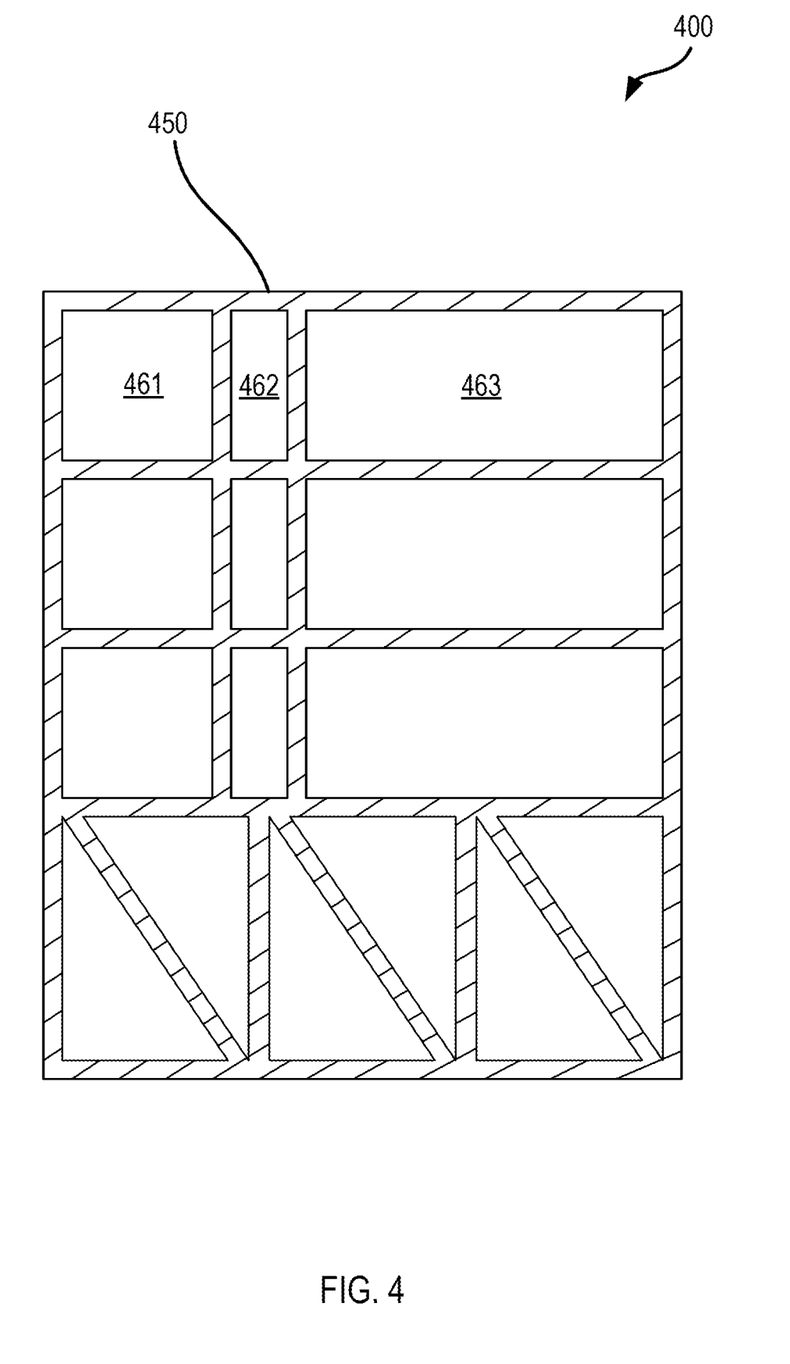
FIG. 4 illustrates a plan (top) view of an acoustic sandwich panel with cavities of varying sizes in accordance with various embodiments.

Referring to FIG. 4, a plan view of an acoustic sandwich panel 400 with cavities of varying sizes/shapes is illustrated according to various embodiments. In various embodiments, it may be desirable to have cavities of multiple volumes or cross-sectional areas to attenuate a broader range of noise frequencies. The dividing walls 450 may be arranged such that a first cavity 461, a second cavity 462, and a third cavity 463 may each have a different volume. Any number of cavities may have the same volume or different volume according to a desired design. As illustrated, the cavities may comprise a variety of shapes, including square, rectangular, hexagonal, or any other suitable shape.

Figure 5:
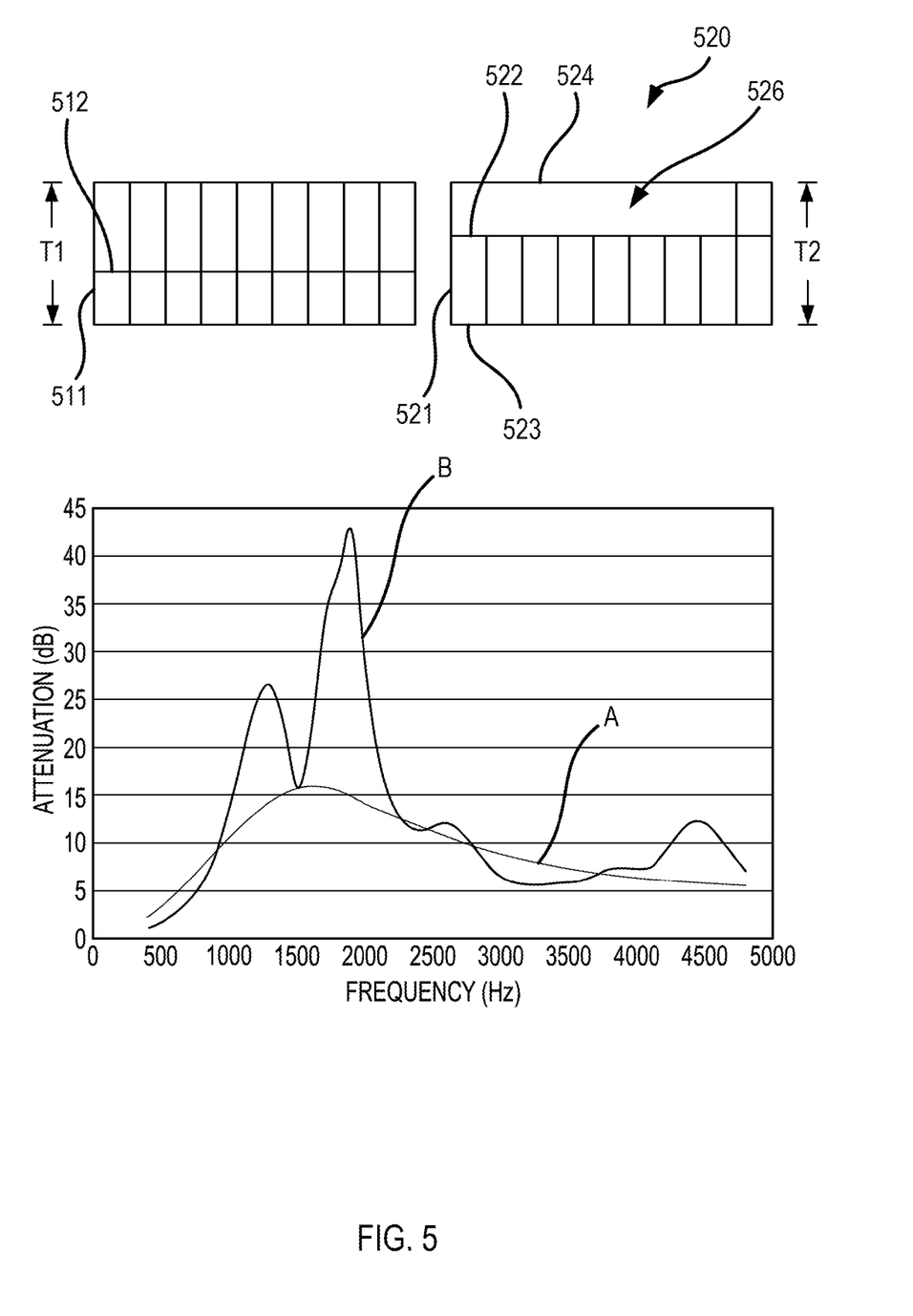
FIG. 5 illustrates model results of attenuation tests in accordance with various embodiments.

Referring to FIG. 5, attenuation results from a computational model are illustrated according to various embodiments. In study case A, a traditional acoustic sandwich panel 510 panel was used. The total thickness T1 of the acoustic panel was 1.5 inches (3.8 cm), and the acoustic sandwich panel 510 comprised a plurality of cells 511 each containing a septum 512. In study case B, an acoustic sandwich panel 520 comprised a plurality of cells 521 between a first skin 523 and a septum 522, and a plurality of back cavities 526 between the septum 522 and the back skin 524. The back cavities 526 had a width equal to the width of eight cells 521. The total thickness T2 of the acoustic sandwich panel 520 in test case B was also 1.5 inches (3.8 cm). The results showed much greater attenuation for test case B between 800 Hz-2200 Hz, and also from 3800 Hz-4800 Hz as compared to test case A. Thus, for the same thickness of composite sandwich panel, test case B with the larger cavities provided superior noise attenuation results. In study case B, the configuration comprises a 30 POA perforate skin and 0.6 inch core depth of the first chamber as well as a 9.5 POA septum and a 0.9 inch cavity depth of the secondary cavity with a 3.2 inch cavity length installed in a flow duct to simulate a certification flight condition. These variables may be altered depending on the desired frequency attenuation and design considerations.

With reference again to FIG. 2A, the structural properties of acoustic panel 200 may be enhanced with a construction where first skin 220 and septum 230 are generally continuous skins or sheets, stretching across multiple cells 212 and bonded or co-cured to the core walls 211, to form a traditional acoustic sandwich panel structure. If perforations are formed in the first skin 220 and the septum 230, they may be formed prior to or following bonding. Dividing walls 250 and back skin 240 may be added after the first skin 220, the core 210, and the septum 230 are co-cured or bonded, by co-curing or bonding to the septum 230. The first skin 220, the core 210, and the septum 230 may form the primary load carrying pathway, while the dividing walls 250 and back skin 240 may be primarily parasitic (not load sharing).

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. An acoustic panel comprising:
   a core;
   a permeable skin coupled to a first side of the core;
   a permeable septum coupled to a second side of the core opposite the first side;
   the core, the permeable skin, and the permeable septum forming a plurality of cells;
   a back skin; and
   a dividing wall extending between the permeable septum and the back skin,
   wherein the permeable septum, the dividing wall, and the back skin define a first back cavity,
   wherein a volume of the first back cavity is greater than a volume of a first cell in the plurality of cells,
   wherein a height of the first back cavity is less than a height of the plurality of cells, and
   wherein the first back cavity is in fluid communication through the permeable septum with a plurality of the plurality of cells.

2. The acoustic panel of claim 1, wherein the core comprises a honeycomb core.

3. The acoustic panel of claim 1, further comprising a second cavity defined by the permeable septum, the dividing wall, and the back skin.

4. The acoustic panel of claim 3, wherein a volume of the first back cavity is equal to a volume of the second cavity.

5. The acoustic panel of claim 4, wherein a width of the first back cavity is greater than a width of the second cavity.

6. The acoustic panel of claim 3, wherein a height of the first back cavity is greater than a height of the second cavity.

7. The acoustic panel of claim 1, wherein a height of a first dividing wall is greater than a height of a second dividing wall.

8. The acoustic panel of claim 1, wherein the first back cavity is rectangular.

9. The acoustic panel of claim 8, wherein the plurality of cells are hexagonal.

10. An acoustic panel comprising:
    a core comprising a plurality of cells; and
    a plurality of back cavities disposed between a septum and a back skin,
    wherein a first back cavity in the plurality of back cavities is in fluid communication with a first cell and a second cell in the plurality of cells via the septum,
    wherein a volume of the first back cavity is greater than a volume of the first cell,
    wherein a height of the first back cavity is less than a height of the plurality of cells, and
    wherein the first cell is in fluid communication with the first back cavity and a second cavity in the plurality of back cavities via the septum.

11. The acoustic panel of claim 10, wherein the core is coupled to the septum and a perforated skin.

12. The acoustic panel of claim 10, wherein a volume of the first back cavity is equal to a volume of the second cavity.

13. The acoustic panel of claim 12, wherein a width of the first back cavity is greater than a width of the second cavity.

* * * * *